US011394762B2

(12) United States Patent
Girardier et al.

(10) Patent No.: US 11,394,762 B2
(45) Date of Patent: Jul. 19, 2022

(54) DEVICE AND METHOD FOR AUTOMATIC SWITCHING OF STREAMING BLUETOOTH MULTIMEDIA DEVICE

(71) Applicant: Google LLC, Mountain View, CA (US)

(72) Inventors: Thomas Girardier, Poisy (FR); Julien Goupy, Le Mesnil-Saint-Denis (FR); Etienne Ruffieux, Paris (FR)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 16/756,252

(22) PCT Filed: Oct. 16, 2018

(86) PCT No.: PCT/EP2018/078159
§ 371 (c)(1),
(2) Date: Apr. 15, 2020

(87) PCT Pub. No.: WO2019/076850
PCT Pub. Date: Apr. 25, 2019

(65) Prior Publication Data
US 2020/0259877 A1    Aug. 13, 2020

(30) Foreign Application Priority Data

Oct. 20, 2017  (EP) ..................................... 17306441

(51) Int. Cl.
*H04L 65/60*     (2022.01)
*H04B 17/27*     (2015.01)
(Continued)

(52) U.S. Cl.
CPC ............. *H04L 65/60* (2013.01); *H04B 17/27* (2015.01); *H04B 17/309* (2015.01);
(Continued)

(58) Field of Classification Search
CPC ....... H04B 17/27; H04B 17/309; H04L 29/06; H04L 65/60; H04L 65/602;
(Continued)

(56) References Cited

U.S. PATENT DOCUMENTS

2010/0232618 A1   9/2010  Haartsen et al.
2014/0135041 A1*  5/2014  Buchheim ............... H04W 4/02
                                                  455/456.6

(Continued)

OTHER PUBLICATIONS

International Search Report, PCT/EP2018/078159, dated Jan. 28, 2019.

(Continued)

*Primary Examiner* — Marsha D Banks Harold
*Assistant Examiner* — Dharmesh J Patel
(74) *Attorney, Agent, or Firm* — Lerner, David, Littenberg, Krumholz & Mentlik, LLP

(57) ABSTRACT

Disclosed is a device for controlling Bluetooth multimedia devices, the device including a Bluetooth chip configured to establish a point to multipoint link from the Bluetooth chip to a plurality of Bluetooth multimedia devices, and to stream a multimedia stream to at least one of the plurality of Bluetooth multimedia devices. The Bluetooth chip is further configured to: retrieve from each Bluetooth multimedia device an indication of a signal strength of each link between the device and the corresponding Bluetooth multimedia device; and select at least one Bluetooth multimedia device to which stream the multimedia stream based on the retrieved indications of signal strength.

19 Claims, 5 Drawing Sheets

(51) Int. Cl.
| | |
|---|---|
| *H04B 17/309* | (2015.01) |
| *H04W 76/25* | (2018.01) |
| *H04W 4/80* | (2018.01) |
| *H04W 4/02* | (2018.01) |

(52) U.S. Cl.
CPC .......... *H04L 65/602* (2013.01); *H04W 4/025* (2013.01); *H04W 4/80* (2018.02); *H04W 76/25* (2018.02)

(58) Field of Classification Search
CPC ...... H04L 65/4069; H04W 4/00; H04W 4/02; H04W 4/08; H04W 4/025; H04W 4/80; H04W 65/602; H04W 76/25; H04W 84/12; H04W 84/18
See application file for complete search history.

(56) References Cited

U.S. PATENT DOCUMENTS

2015/0195857 A1* 7/2015 Pan ................. H04W 76/10
455/41.3
2016/0157046 A1 6/2016 Weizman et al.

OTHER PUBLICATIONS

"Baseband Specification—General Description", Bluetooth Specification Version 4.0 [vol. 2], Jun. 30, 2010 (Jun. 30, 2010), p. 65, XP055445769, Retrieved from the Internet:URL:https://www.bluetooth.org/docman/handlers/downloaddoc.ashx?doc id=229737, [retrieved on Jan. 29, 2018] p. 65.
Written Opinion, PCT/EP2018/078159, dated Jan. 28, 2019.
Baseband Specification—General Description. Bluetooth Specification Version 4.0 [vol. 2], Jun. 30, 2010, p. 65. Retrieved from the Internet: <https://www.bluetooth.org/docman/handlers/downloaddoc.ashx?docid=229737>.
Office Action for European Patent Application No. 17306441.1 dated Feb. 2, 2022. 9 pages.

\* cited by examiner

DEVICE AND METHOD FOR AUTOMATIC SWITCHING OF STREAMING BLUETOOTH MULTIMEDIA DEVICE

FIELD OF THE INVENTION

The invention relates to a device for controlling Bluetooth multimedia devices, particularly Bluetooth speakers (Bluetooth is a registered trademark of Bluetooth SIG, Inc.).

BACKGROUND OF THE INVENTION

Today, multi room wireless sound systems are mainly built using the Wi-Fi technology, which offers a stable way to synchronize multiple wireless speakers across many rooms. All speakers are connected to a local network over Wi-Fi and can be controlled by any device that has access to the network.

In Wi-Fi multi room sound systems, it is known for a user to select a room he wants play by selecting the latter through the user interface of a controller that is connected to the network. However, the management of the playing speaker or speakers is not currently done automatically.

Such automatic selection of the playing speaker(s) would however be very convenient because it would avoid the need for the user to select a new speaker each time he moves from a room to another.

On the other hand, systems are known which comprise a plurality of Bluetooth speakers that are all controlled by a device. Bluetooth is a communication standard that is well-known to the person skilled in the art. It enables bidirectional exchange of data over a short-distance range, which is typically limited to a few tens of meters. This makes Bluetooth communication particularly suitable for a private use such as in an apartment or house.

Bluetooth speakers have met with a certain success due to their high portability. Moreover, it is possible to create a point-to-multipoint link between a Bluetooth device and each of a plurality of several speakers, in order to simultaneously stream music on multiple speakers.

However, for Bluetooth systems as well is has not been yet proposed a way to automatically select one or several Bluetooth speakers for playing an audio stream sent by a master device.

PRESENTATION OF THE INVENTION

In view of the above, the invention aims at providing a solution for the automatic selection of a wireless multimedia playing device in a system comprising a master device and a plurality of multimedia playing devices.

Another aim of the invention is to implement automatic selection of speaker(s) in a Bluetooth system.

To this end, a device for controlling Bluetooth multimedia devices is disclosed, the device comprising a Bluetooth chip configured to establish a point to multipoint audio link from said Bluetooth chip to a plurality of Bluetooth multimedia devices, and to stream a multimedia stream to at least one of the plurality of Bluetooth multimedia devices, characterized in that the Bluetooth chip is further configured to:
- retrieve from each Bluetooth multimedia device an indication of a signal strength of each link between the device and the corresponding Bluetooth multimedia device, and
- select at least one Bluetooth multimedia device to which the multimedia stream is to be streamed based on the retrieved indications of signal strength.

In one embodiment, the Bluetooth chip is configured to select the Bluetooth multimedia device which indication of signal strength is highest.

In another embodiment, the Bluetooth chip is configured to select each Bluetooth multimedia device which indication of signal strength is higher than a predetermined threshold.

In embodiments, the device comprises a calculator configured to determine a localization of the device relative to the Bluetooth multimedia devices based on the retrieved signal strength indications, and the Bluetooth chip is further configured to select at least one Bluetooth multimedia device according to the determined localization. The calculator may be configured to determine the localization of the device by triangulation or fingerprinting. The Bluetooth chip may be further configured to adapt the multimedia stream of each Bluetooth multimedia device according to the localization of the device, said adaptation comprising adapting an emission volume, a frequency, or the allocation of each of a plurality of channels of the multimedia stream.

In embodiments, the controlling device further comprises at least one motion or orientation sensor, and the calculator is configured to determine a localization of the device based on the retrieved signal strength indications and data acquired by the at least one motion or orientation sensor.

Preferably, the Bluetooth chip is further configured to ping each Bluetooth multimedia device to which no multimedia stream is streamed to prevent the Bluetooth multimedia device from switching off.

According to another object of the invention, a Bluetooth multimedia system comprising a plurality of Bluetooth speakers and a device according to the preceding description is disclosed.

According to another object of the invention, a method for controlling Bluetooth multimedia devices by a Bluetooth chip is disclosed, comprising:
- creating a point-to-multipoint audio link from said Bluetooth chip to a plurality of Bluetooth multimedia devices,
- retrieving from each Bluetooth multimedia device an indication of a signal strength of each link between the device and the corresponding Bluetooth multimedia device,
- selecting at least one Bluetooth multimedia device based on the retrieved signal strength indications, and
- streaming a multimedia stream to each of the selected Bluetooth multimedia devices.

In embodiments, the signal strength indication retrieved from each of the plurality of Bluetooth multimedia devices is a RSSI value, and the method further comprises a step of harmonizing the RSSI values of the Bluetooth multimedia devices, said harmonizing step comprising applying weighing factors to the RSSI values of the various Bluetooth multimedia devices.

The selection step may be performed by:
- selecting the Bluetooth multimedia device which signal strength indication is highest, or
- selecting each Bluetooth multimedia device which signal strength indication is higher than a predetermined threshold.

In embodiments, the method may further comprise a step of localizing the Bluetooth chip relative to the Bluetooth multimedia devices, and the selection of the Bluetooth multimedia devices is performed based on the localization of the Bluetooth chip.

Another object of the invention is a computer program product comprising a set of instructions adapted to implement the above-disclosed method, when they are executed by a processor.

Another object of the invention is a non-transitory computer-readable storage medium, storing a computer program according to the invention.

The invention combines a system comprising multiple Bluetooth multimedia devices controlled by a master device with signal strength detection technology to perform automatic selection of the Bluetooth multimedia device that plays an audio stream streamed by the master device.

The invention also allows localizing the master device, and performing the selection of the multimedia device and adjusting parameters of the multimedia stream played by each multimedia device based on this localization.

BRIEF DESCRIPTION OF THE DRAWINGS

Other features and advantages of the invention will be apparent from the following detailed description given by way of non-limiting example, with reference to the accompanying drawings, in which.

DETAILED DESCRIPTION OF EMBODIMENTS OF THE INVENTION

In all that follows, A2DP stands for "Advanced Audio Distribution Profile." The conventional A2DP profile defines a set of protocols and procedures for the exchange of audio data via the Bluetooth protocol between a master device (known as the Source) and a slave device (known as the "Sink", designating the ultimate destination of a stream, for example a Bluetooth speaker). This A2DP profile is constructed using several layers defined by the Bluetooth standard. The conventional A2DP profile is shown schematically on the right-hand part of FIG. 1.

The profile relies in particular on low-level layers that are well known to those skilled in the art. These layers comprise:
 a "Baseband" layer, the Baseband layer being identified by the reference BB in FIG. 1,
 an "LMP" layer (acronym for "Link Manager Protocol");
 an "L2CAP" layer (acronym for "Logical Link Control and Adaptation Protocol"),
 an SDP layer ("Service Discovery Protocol").

These layers are protocols defined in the Bluetooth standard.

Figure 1:
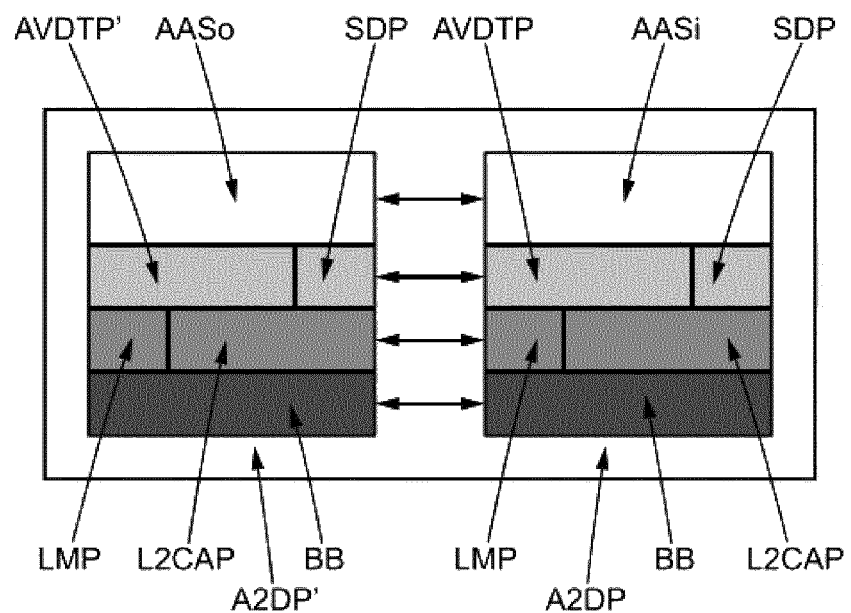
FIG. 1 illustrates a conventional A2DP profile, as well as an A2DP' profile arranged to communicate with the conventional A2DP profile.

The A2DP profile also relies on a high-level layer called the application layer (denoted AASo and AASi in FIG. 1, respectively for "Application Audio Source" and "Application Audio Sink"). This is the layer in which the device determines the transport parameters and the various services available. It is also at this level that the choice of codec used to transmit the audio data is made (which may involve decoding followed by re-encoding when the audio stream to be transmitted is already encoded, which is usually the case).

Lastly, the A2DP profile relies on an AVDTP layer ("Audio/Video Distribution Transport Protocol") that defines the binary transactions between Bluetooth devices for setting up a stream and for streaming an audio and/or video stream using L2CAP. It therefore covers procedures for establishing the audio stream, negotiating the parameters of the audio stream, and transmitting the data of the audio stream. AVDTP comprises a signaling entity for negotiating streaming parameters and a transport entity for managing the stream itself. AVDTP defines a transport protocol for audio and/or video data. More specifically, AVDTP concerns the transport of audio and/or video data between two SEPs.

An SEP is a "Stream End Point". Bluetooth communications are point-to-point between two SEPs. An SEP represents the resources and capabilities of a device. For example, a device such as a mobile phone may have three SEPs, one representing its capabilities as a video receiver, another representing its capabilities as an audio receiver with an SBC codec, and a last one representing its capabilities as an audio receiver with an aptX codec. Each codec must be associated with a different SEP than the one(s) associated with other codec(s), but the same codec can be associated with multiple SEPs.

A limitation imposed by AVDTP according to the Bluetooth standard is that when a connection has been negotiated between two SEPs, these two SEPs must be locked to each other for streaming. By default, a connected SEP refuses any new connections. In recent Bluetooth products, a function known as "social mode" sometimes allows changing this default behavior. However, although this social mode function allows a new connection, it cuts off the current connection. For example, there can be two telephones connected to the same Bluetooth speaker, but multiple simultaneous transports cannot be set up. Switching to a new connection typically occurs by terminating the previous connection while keeping the previously connected telephone in memory. As a result, if there is only one audio source SEP on a Source device then only one AVDTP transport can be established to a given Sink device at a given time, according to the Bluetooth standard.

The L2CAP layer defines the most basic data exchange protocol of the Bluetooth specification. The L2CAP layer enables the segmentation and reassembly of packets, multiplexing, and quality of service. It is from this L2CAP layer that the various transport protocols (such as AVDTP) based on different Bluetooth profiles (such as A2DP) are implemented. An L2CAP channel is created between a CID ("Channel Identifier") of a master device and a CID of a slave device, allowing the exchange of data between these two devices. The L2CAP channels are each configured to manage the control of data streams passing through channels defined by L2CAP (L2CAP channels). For this purpose, different parameters can be taken into account independently for each L2CAP channel, in particular:
 An FTO or "Flush Timeout" parameter defines an expiration period for a data packet in a buffer memory of a master device. This period is infinite by default (blocked mode), which means that a transmitted packet that does not reach its destination is resent until a packet (the initial packet or the resent packets) has reached the destination. However, the period can also be such that retransmission never occurs (if the "Flush Timeout" parameter is set to an appropriate value defined by the Bluetooth standard), which amounts to a zero period. The period can also have a finite value. There exists a Boolean variable called "flag non-automatically flushable" in Bluetooth packets, which allows indicating that the packet concerned cannot be deleted automatically.

A QoS parameter (acronym for "Quality of Service") which enables defining the maximum latency between inclusion of a packet to be transmitted in an L2CAP channel and its actual transmission.

Parameters called "Extended Flow Features", replacing and supplementing the combination of the "Flush Timeout" and "QoS" parameters mentioned above.

These parameters are negotiated between the Bluetooth stack of a master Bluetooth device and the Bluetooth stack of a slave Bluetooth device, and apart from the default values are not always supported.

L2CAP enables the implementation of different modes. These modes are also parameters of the L2CAP channels, in the same manner as the "Extended Flow features" parameters or the "Flush Timeout" parameter. It is the set of all these parameters (including modes) that enables modifying the control of streams. Each mode defines different procedures for managing data streams. Within the conventional Bluetooth framework (called BR/EDR), five operating modes are possible for an L2CAP channel. These modes are:
"Basic Mode" (basic L2CAP mode),
"Flow Control Mode",
"Retransmission Mode",
"Enhanced Retransmission Mode" (known as "ERTM"), and
"Streaming Mode" (known as "SM").

"Basic Mode" is the default mode and is supported by all Bluetooth stacks. It does not require any configuration. "Flow Control Mode" sends packets but never retransmits lost packets. However, these packets (called PDUs) are detected when they are lost, and "Flow Control Mode" allows the communication of a report listing the lost packets. "Flow Control Mode" and "Retransmission Mode" can only be used if "ERTM" and "SM" are not usable. These two modes ("Flow Control Mode" and "Retransmission Mode") are now almost never used. "ERTM" makes it possible to take into account a given maximum number of retransmissions and a given maximum duration during which a retransmission can take place, and makes it possible to identify the packets that are lost or corrupted. "SM" is adapted for asynchronous data flows. It takes into account a finite "Flush Timeout" parameter. On the Bluetooth receiver side, if the buffer memory is full the previous data are overwritten.

In the Bluetooth standard, a parameter called "Retransmission and flow control option" allows choosing a mode. The Bluetooth standard recommends establishing "reliable" connections that limit data loss, using a "Basic Mode" with an infinite "Flush Timeout", or in more recent Bluetooth stacks "ERTM" with any "Flush Timeout".

Bluetooth Multimedia System

Figure 2A:
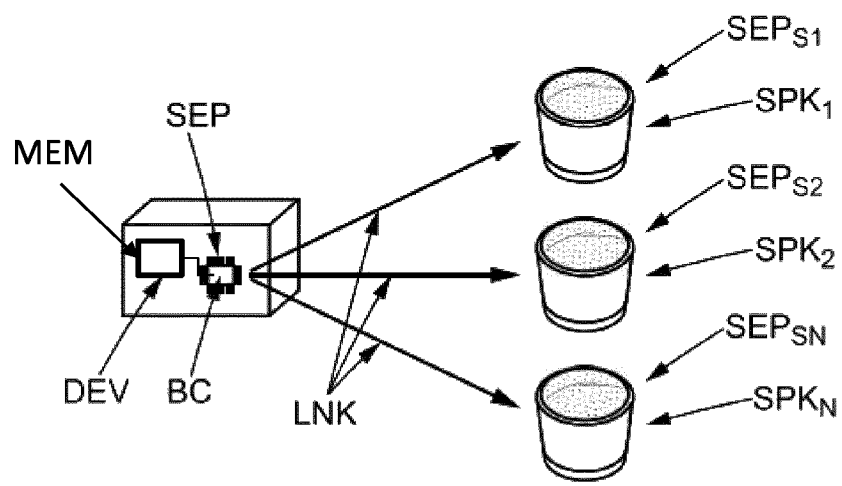
FIGS. 2a and 2b illustrate a system comprising a device according to an embodiment of the invention as well as a set of Bluetooth speakers.
Figure 2:
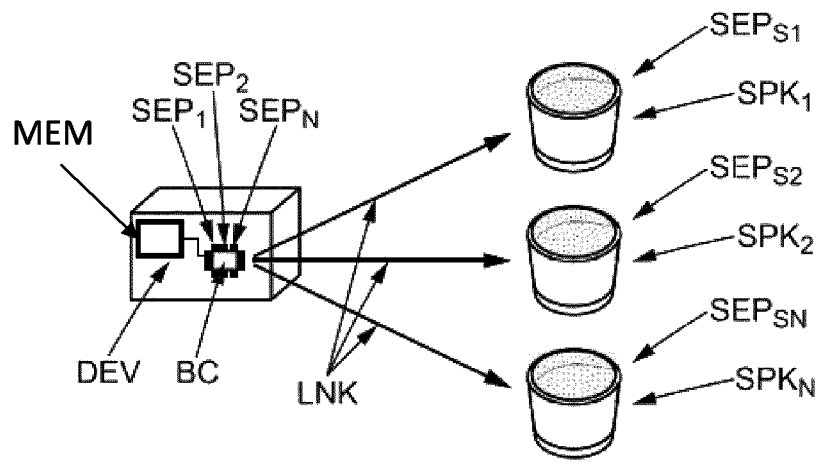

With reference to FIGS. 2a and 2b, a system is shown comprising a plurality of Bluetooth multimedia devices $SPK_i$ and a device DEV for controlling the Bluetooth multimedia devices $SPK_i$, this control device comprising a Bluetooth chip BC, and a memory MEM storing code instructions for execution by the Bluetooth chip.

Bluetooth multimedia devices are, for example, Bluetooth speakers. "Bluetooth speaker" indicates any Bluetooth device containing at least one loudspeaker arranged to broadcast a sound that can be simultaneously heard by multiple people. It may, for example, be an acoustic speaker for a hi-fi system, or a mobile phone equipped with a loudspeaker intended to be audible to multiple people, provided that it is this loudspeaker that is controlled by the control device. More precisely, "sound that can be simultaneously heard by multiple people" is understood to mean a sound that is perceptible (in the sense that its content can be distinguished) by any person with normal hearing positioned at a distance of at least one meter from the speaker, in the presence of ambient noise corresponding to that of a conversation, meaning approximately 40 dB SPL. A headset, an ear bud, or a telephone receiver are therefore not speakers within the meaning of the present application, since they must be positioned in or against the ear in order to hear the emitted sounds.

More generally, each of the Bluetooth multimedia devices can be a Bluetooth television, a Bluetooth screen, a Bluetooth mobile phone, a Bluetooth laptop or desktop, a Bluetooth tablet, a Bluetooth hi-fi system, a Bluetooth car stereo, or a Bluetooth digital media player.

The control device DEV is, for example, a Bluetooth television, a Bluetooth screen, a Bluetooth mobile phone, a Bluetooth laptop or desktop, a Bluetooth tablet, a Bluetooth hi-fi system, a Bluetooth car stereo, a Bluetooth digital media player, or a personal virtual assistant with Bluetooth capabilities.

The Bluetooth chip BC is configured to implement a modified A2DP profile shown in the left-hand part of FIG. 1 and denoted A2DP', the A2DP' being modified so as to create a point-to-multipoint link LNK from said Bluetooth chip to a plurality of Bluetooth multimedia devices $SPK_1$, $SPK_2$, $SPK_N$. The Bluetooth chip of the control device is arranged to transmit a plurality of multimedia streams related to each other, each intended for a respective Bluetooth multimedia device among said plurality of Bluetooth multimedia devices, while relying on a non-blocking usage of Bluetooth. It is understood that multimedia streams "related to each other" means that the multimedia streams relate to the same situation (for example the same scene or the same music) and can be identical or different. For example, the multimedia streams can be six audio streams each corresponding to one of the 5.1 channels of an audio recording, or can be several videos of the same scene, filmed at the same time but from different viewpoints. The control device is for example arranged to transmit an audio stream (or more generally a multimedia stream) via a Bluetooth wireless link. For example, it stores or relays a multimedia stream comprising at least an audio channel. For example, it stores MP3 files, or connects to a server (such as a Youtube® server) from which it downloads a stream that it progressively and simultaneously retransmits via Bluetooth to multiple Bluetooth multimedia devices.

By relying on a non-blocking usage of Bluetooth instead of the blocking usage that is the default in A2DP, the control device avoids loss of synchronization. "Non-blocking usage of Bluetooth" is understood to mean any configuration of Bluetooth (via a Bluetooth mode and/or via other Bluetooth parameters) that does not block the Bluetooth chip of the device for controlling Bluetooth multimedia devices. A non-blocking usage of Bluetooth is therefore a use of Bluetooth which avoids forcing the Bluetooth chip to retransmit an unreceived packet as long as it has not been received, and which also avoids forcing it to retransmit such a packet beyond the moment when at least one Bluetooth multimedia device no longer has data in its buffer memory due, for example, to unsuccessful packet retransmission attempts monopolizing the Bluetooth communications. A non-blocking usage corresponds to a set of parameters (FTO, QoS, Mode, Extended Flow features) and not only to a mode (such as SM mode) in the sense of the Bluetooth standard. This involves for example the "Flow Control" mode or any mode in which the "Flush Timeout" parameter is set according to the Bluetooth standard to prevent any retransmission. Conversely, a blocking usage is a usage which leads, for example, to retransmitting data as long as it has not been received, or which leads to retransmitting data when a higher priority Bluetooth multimedia device is also awaiting data and has not received them because of said use (it is therefore blocked). Blocking usage is used in the prior art because it avoids occasional data losses (in the event of a prolonged cutoff for a period exceeding a given threshold, blocking usage does not prevent loss of data). In the assumption that Bluetooth is adapted to allow point-to-multipoint streaming, employing a non-blocking usage eliminates the risk of a Bluetooth multimedia device becoming inaccessible and preventing any transmission of data to all the Bluetooth multimedia devices. A Bluetooth multimedia device may become inaccessible for example because it has been moved out of range of the Bluetooth chip of the control device DEV, or because it contains a battery that has been exhausted, or for any other reason.

The default Bluetooth L2CAP settings mentioned in the beginning of the description are not suitable for setting up an A2DP synchronized link of a Bluetooth master device to multiple Bluetooth slave devices. Indeed, if one of the links established between the master and a slave (for example a speaker) is configured with an infinite "Flush Timeout", and if the speaker leaves the Bluetooth field or is powered by a battery which is then exhausted, then the data will be continually sent to the speaker which never receives it and will therefore block any other transmission of data to the other slave devices (as the data are sent sequentially). On the other hand, if the "Flush Timeout" parameter is defined by default, the resending of data to a speaker could cause a time lag between this speaker and the others. When a speaker that has left the Bluetooth field of the master Bluetooth device returns to said field, it would then continue broadcasting the stream from the point where it had stopped due to leaving said field.

According to one possible implementation, the device for controlling Bluetooth multimedia devices is arranged to determine automatically, from the different configurations supported by the Bluetooth stacks of the Bluetooth multimedia devices, the configuration to be adopted for each L2CAP channel (corresponding to a logical link between the Bluetooth chip of the device for controlling Bluetooth speakers and a Bluetooth multimedia device) so as to maintain a synchronized link between the device for controlling Bluetooth multimedia devices and the various slave multimedia devices. The L2CAP parameters of each of the multimedia devices may be different (they may depend on the characteristics of these multimedia devices, their ability to support certain protocols, etc.).

According to one possible implementation, the device for controlling Bluetooth multimedia devices is arranged to set all the Flush Timeouts for the various L2CAP channels to the value defined by the Bluetooth standard (namely 1, but this could vary depending on the implementations) so that no retransmission is performed. The connection thus obtained is unreliable in the sense that transmission errors or losses are not remedied, but ensures synchronization after any packet loss.

According to another implementation, the Bluetooth chip BC of a device for controlling Bluetooth multimedia devices DEV is arranged, when a multimedia stream packet that is transmitted to a Bluetooth multimedia device is lost, to resend said multimedia stream packet to said Bluetooth multimedia device. The Bluetooth chip BC is arranged to determine a fill rate of a buffer memory of at least one Bluetooth multimedia device SPK1, SPK2, SPKN and to determine a maximum duration during which it can resend the lost multimedia stream packet to the Bluetooth multimedia device according to the fill rate of the buffer memory of the at least one Bluetooth multimedia device.

According to a possible implementation, this maximum duration 30 corresponds to the least filled buffer memory among the buffer memories of all the other Bluetooth multimedia devices, for which it must deduce the time necessary for transmitting a sufficient portion of the multimedia stream. Therefore the content of the buffer memory of the Bluetooth multimedia device that lost a packet is not taken into account.

According to another implementation, this maximum duration corresponds to the least filled buffer memory among the buffer memories of all the Bluetooth multimedia devices (including the one that lost the packet), for which it must deduce the time necessary for transmitting a sufficient portion of the multimedia stream. In fact, if the Bluetooth multimedia device that lost the packet runs the risk of running out of multimedia stream data to play, it can be considered more appropriate to abandon the attempt to retransmit the lost packet, which in any case would be restored as delayed and thus desynchronized from the other Bluetooth multimedia devices.

According to another implementation, the Bluetooth chip is arranged to identify the Bluetooth multimedia devices for which it is unnecessary to verify the fill rate of the buffer memory. For example, the Bluetooth chip can exclude a number n of Bluetooth multimedia devices in which it powered the buffer memories last, if it can deduce that other Bluetooth multimedia devices necessarily exist in which the buffer memory is less filled and which will determine the aforementioned maximum duration.

According to another implementation, the Bluetooth chip is arranged to store an identifier of the Bluetooth multimedia device, the buffer memory of which it powered longest. When a packet is lost, the Bluetooth chip then only verifies the buffer memory of this Bluetooth multimedia device, the buffer memory of which it powered longest. According to a possible implementation, the controlling device is arranged to transmit portions of audio stream of about 14 ms (which corresponds to the duration of an audio stream block encoded by the SBC codec). According to a possible implementation, the controlling device controls four Bluetooth multimedia devices, and the transmission of a portion of about 14 ms takes about 1.3 ms. Thus it takes about 4*1.3 ms or 30 about 5.2 ms to transmit about 14 ms of stream to the four Bluetooth multimedia devices, which leaves about 14 ms-5.2 ms or about 8.8 ms during which the controlling device can identify the packets that were improperly transmitted or not transmitted and retransmit them.

According to a possible implementation, the device for controlling Bluetooth multimedia devices is arranged to configure the "Flush Timeout" of each L2CAP channel depending on the fill state of the buffer memories of the Bluetooth multimedia devices, that it must estimate beforehand for example by one of the aforementioned methods.

According to still another possible implementation, it is considered the case where the "Flush Timeout" of a L2CAP channel indicates that an infinite number of retransmissions is allowed (i.e. retransmission is performed until the link is lost). In that case, the device for controlling Bluetooth multimedia device is arranged to request a flush of the packets present in the L2CAP layer which are associated with the L2CAP channel, when the device for controlling Bluetooth multimedia device considers that retransmission is not effective. The request will have the effect to reset all the pending retransmissions for the specific L2CAP channel so that new packets are transmitted. In an example, a retransmission is not considered effective where the size of the queue storing the packets to be retransmitted, is greater than a predetermined size value. In another example, a retransmission is not considered effective where congestion is detected in the queue storing the packets to be retransmitted.

The modification of the A2DP profile may consist of modifying the AVDTP layer used by the A2DP profile, for example in one of the ways indicated below. In order to implement an AVDTP layer corresponding to a modified AVDTP layer, it is possible in particular to use an available implementation such as BlueZ (well known to those skilled in the art), designed to implement Bluetooth technology on Linux operating systems and available under the GNU GPL license. The BlueZ implementation has become a reference Bluetooth implementation for Linux and has been integrated into the Linux kernel.

According to one possible implementation which is illustrated schematically in FIG. 2a, the Bluetooth chip BC of a device DEV for controlling Bluetooth multimedia devices is arranged to generate a single SEP for controlling all the Bluetooth multimedia devices. More precisely, the A2DP profile of the Source SEP (Bluetooth chip BC) is modified, for example by substituting a modified AVDTP' layer for a conventional AVDTP layer. The change consists of removing restrictions that prevent a Source SEP from connecting to more than one Sink SEP. However the Bluetooth standard does not require checking a Sink SEP to verify the Source SEP with which it communicates does not also communicate with another Sink SEP. It turns out that it is technically possible, from the same Source SEP, to broadcast multimedia streams (in particular audio) to multiple Sink SEPs from a Single Bluetooth chip.

As the Bluetooth standard does not allow communication from one Source SEP to multiple Sink SEPs, the present implementation constitutes a sort of extension to the Bluetooth standard, an extension which does not create any difficulties since the Bluetooth standard is not designed to detect such an extension.

It is of course possible to provide, in the device DEV for controlling Bluetooth multimedia devices SPK, a plurality of Bluetooth chips each arranged to generate a single SEP for controlling the Bluetooth multimedia devices respectively managed by each one. For example, a Bluetooth chip no. 1 could manage multimedia devices numbered 1 to 5, a Bluetooth chip no. 2 could manage multimedia devices numbered 6 to 10, and a Bluetooth chip no. 3 could manage multimedia devices numbered 11 to 15. The maximum throughput of a Bluetooth chip limits the number of multimedia devices it can control, and if the number of multimedia devices exceeds a given threshold, the addition of a Bluetooth chip would allow controlling additional multimedia devices simultaneously.

According to another possible implementation which is shown schematically in FIG. 2b, the Bluetooth chip BC of a device DEV for controlling Bluetooth multimedia devices can be arranged to generate a plurality of SEPs ($SEP_1$, $SEP_2$, $SEP^N$) for controlling the Bluetooth multimedia devices $SPK_i$.

According to one advantageous implementation, the Bluetooth chip generates a separate Source SEP for each Sink SEP $SEP_{S1}$, $SEP_{S2}$, $SEP_{SN}$ (corresponding to each Bluetooth multimedia device that it is to control). This is an alternative of the aforementioned implementation, where the Bluetooth chip is more in accordance with the Bluetooth standard. Indeed, the appearance is more of point-to-point links and not to point-to-multipoint link. This is of course a trick which consists of generating a plurality of virtual SEPs in the same Bluetooth chip to simulate a plurality of Source devices where there is actually only one Bluetooth chip.

Speaker Selection

The Bluetooth chip BC of the controlling device DEV is further configured to automatically select at least one of the Bluetooth multimedia devices SPK to which stream a multimedia stream according to the localization of the device DEV. Therefore the user does not have to manually change the emitting Bluetooth multimedia devices according to its position, if for example he moves from a room to another in a house.

A typical use case of this automatic selection is that of a multi Bluetooth audio enabled smartphone used a the controlling device DEV, which is used to control a plurality of Bluetooth speakers as the Bluetooth multimedia devices SPK, in a place comprising multiple rooms such as a house or flat. More generally, the controlling device DEV can be any portable controller, including a laptop, smartwatch or digital tablet, and which is configured to control a plurality of Bluetooth multimedia devices. Thanks to this automatic selection, the user can move across different rooms with the controlling device DEV and the output will automatically switch.

Automatic selection can also be performed in only one room for implementation of acoustic algorithms.

Figure 6:
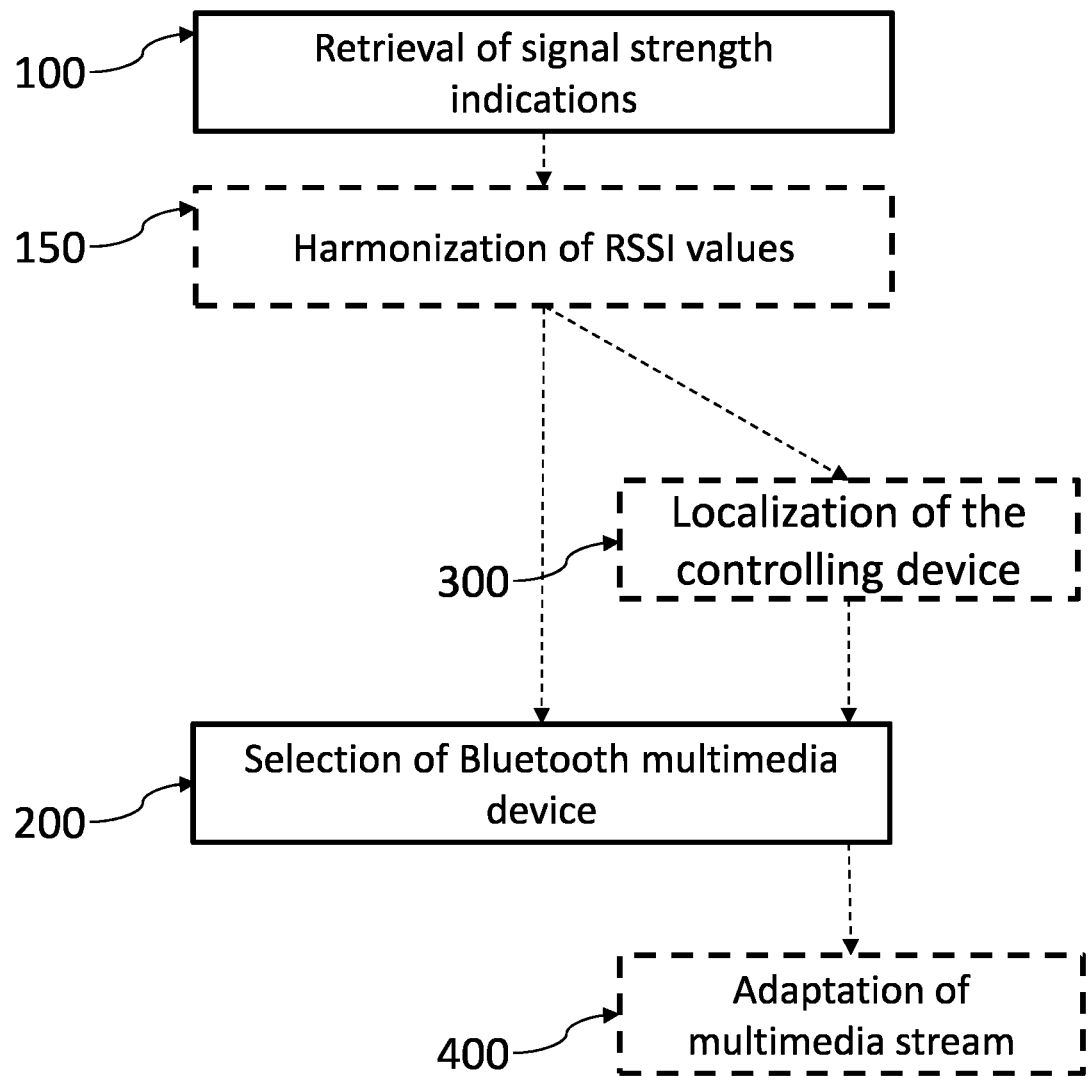
FIG. 6 schematically shows the main steps of a process of controlling Bluetooth multimedia speakers.

The selection process performed by the controlling device DEV is described below with reference to FIG. 6. This process is implemented once a point-to-multipoint link between the Bluetooth chip and each of the plurality of Bluetooth multimedia devices has been established.

In order to perform the selection, the Bluetooth chip retrieves during a step 100, from each of the plurality of Bluetooth multimedia devices SPK an indication of the signal strength of each link between the device DEV and the corresponding Bluetooth multimedia device. This indication is preferably an RSSI value, which is the acronym for "Received Signal Strength Indication", and which is well known by the skilled person. This indication could also be a RX value. Both RSSI or RX values are directly accessible by the controlling device DEV when it is connected to the Bluetooth multimedia devices.

In the case where the signal strength indication is a RSSI value, this indicator is a relative value which depends on the model of the Bluetooth chip of the controlling device, and which also depends on the transmit power of the Bluetooth multimedia device. Typically, the RSSI value may depend on the power class of the Bluetooth multimedia device. Thus in that case the process preferably comprises an additional step 150 of harmonizing the received RSSI values in order to make them comparable.

According to one embodiment, such harmonizing step can be performed by determining the transmit power of each Bluetooth multimedia device, and inferring from the determined transmit powers some weighing factors of the RSSI values corresponding to respective Bluetooth multimedia devices.

According to another embodiment, the harmonizing step can be performed through use of a database in which each model of Bluetooth multimedia device is identified and associated with a RSSI profile. When the controlling device DEV establishes a connection with a Bluetooth multimedia device, it can retrieve an identifier of the device obtained from some data such as the name and Bluetooth chip ID of the device, and access thanks to this identifier the profile corresponding to the model of the Bluetooth multimedia device. The profile can for example comprise a weighing factor to apply to the RSSI value retrieved at this Bluetooth multimedia device. The RSSI profile can be established during a previous calibration phase.

By default, there is only one audio link between the controlling device DEV and each Bluetooth multimedia device SPK, however in some embodiments, there can be more, for example, a remote control link (AVRCP) or Bluetooth Low Energy (BLE) link, either because the Bluetooth multimedia device integrates a BLE chipset for specific commands, or because it is associated to a beacon. In this case, the Bluetooth chip BC of the controlling device is preferably configured to use one or the RSSI values or combined the plurality of RSSI values of a same device into an overall indication of signal strength. For instance, the Bluetooth chip may be adapted to compute an average value out of the harmonized RSSI values.

The signal strength indication is advantageously used for the automatic output Bluetooth multimedia device selection. Indeed, in general, the greater the signal strength, the closer the device is to the Bluetooth multimedia device.

Thus the process performed by the controlling device then comprises a step of selecting 200, according to the obtained signal strength indications, one or a plurality of Bluetooth multimedia device as output of the multimedia stream.

Figure 3A:
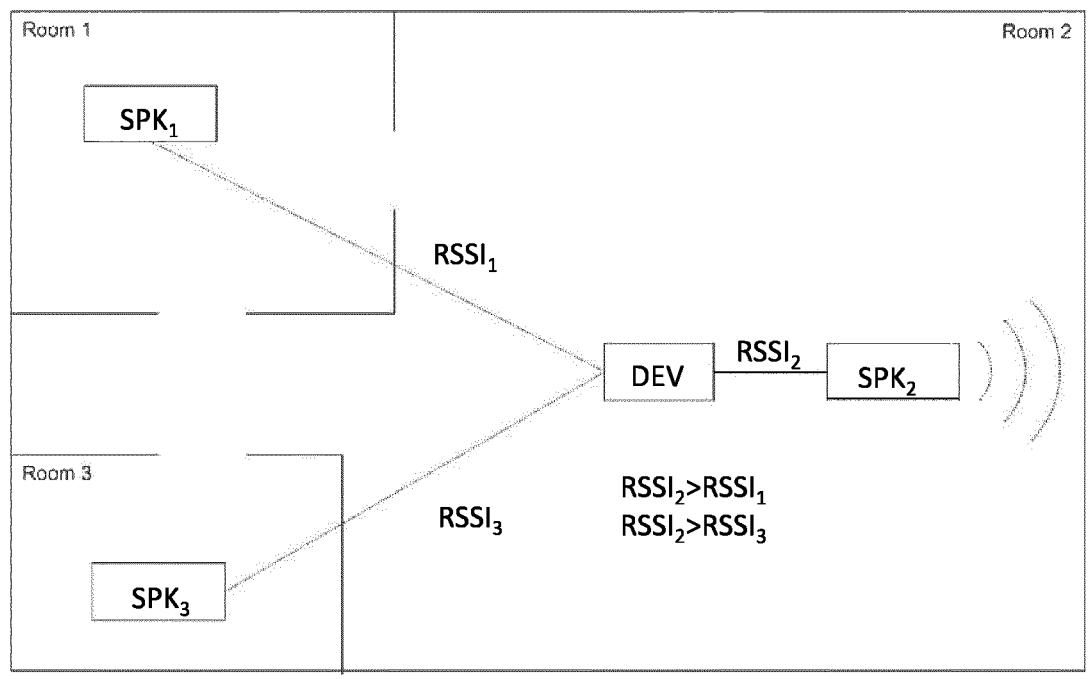
FIGS. 3a and 3b show two examples of a speaker selection according to an embodiment of the invention.
Figure 3B:
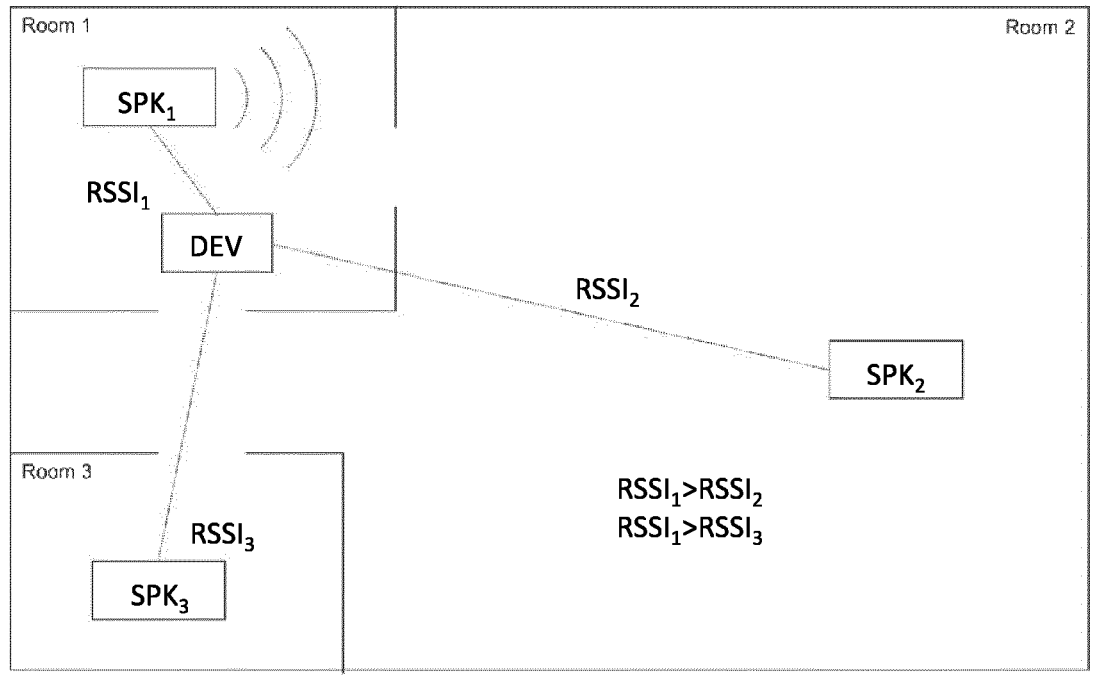

According to a first embodiment shown in FIGS. 3a and 3b, the selection step 200 is performed by selecting a single Bluetooth multimedia device, which is the one corresponding to the highest signal strength indication.

In the example shown on FIG. 3a, three Bluetooth speakers are located in different rooms. On FIG. 3a, when the controlling device DEV is located in room 2, the highest RSSI value corresponds to that $RSSI_2$ of speaker 2 $SPK_2$. When the controlling device, which can for instance be a smartphone held by a user, moves to room 1, then closest speaker becomes speaker 1 $SPK_1$ and is associated with the highest RSSI value corresponding to $RSSI_1$, so the controlling device selects speaker 1 $SPK_1$ to stream the multimedia stream.

Figure 4:
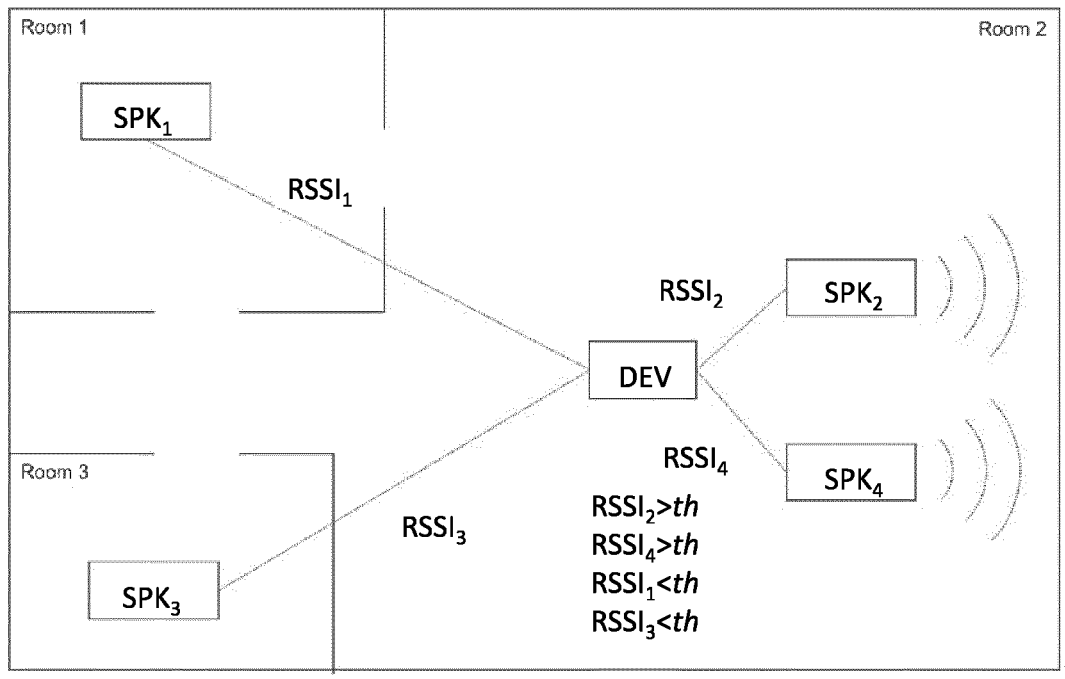
FIG. 4 shows an example of speakers selection according to another embodiment of the invention.

According to a second embodiment shown in FIG. 4, the selection step 200 is performed by selecting one or a plurality of Bluetooth multimedia device(s) which signal strength indication is higher than a predetermined threshold th. This embodiment has the advantage to permit to stream on multiple speakers which are in the same room. However this embodiment needs to previously calibrate the value of the predetermined threshold: as the RSSI value is a relative measurement that is mostly defined by each chip manufacturer, it can vary from different controlling devices and from different environments, such as different apartments or houses. The threshold is preferably determined according to RSSI values that have been harmonized according to step 150 described above.

In the example shown in FIG. 4, two speakers are located in the same room and the controlling device DEV can thus stream a multimedia stream on both speakers simultaneously when it is also in this room.

These two first embodiments are referred to as "proximity switching".

In other embodiments, the process also comprises a step 300 of determining the localization of the controlling device based on the received signal strength indications, and the step 200 of selecting one or several Bluetooth multimedia devices is performed based on the determined localization.

Several approaches can be used for the implementation of the step 300 of localizing the controlling device DEV.

According to a first approach, the Bluetooth chip BC is configured to localize the controlling device DEV by triangulation based on the received signal strength indications. Triangulation is based on estimation of a distance between the controlling device DEV and each of the Bluetooth multimedia devices SPK, the distance being estimated based on signal attenuation. This approach is preferably performed in an open space environment in with line of sight propagation between the controlling device DEV and each Bluetooth multimedia device, because the signal strength indication may be highly influenced by walls in some buildings.

According to another approach, localization 300 can be performed by fingerprinting. Fingerprinting is a localization method comprising two phases. In a first learning phase, vectors are composed of the signal strength indication values and optional extra features measured by the controlling device DEV in known locations are collected.

The vectors are mapped together with the physical locations, such as with physical rooms, and possible location coordinates of the controlling device DEV, if the latter comprises a geolocalization sensor such as a GPS sensor. This forms a database wherein each possible location has a fingerprint formed of the corresponding signal strength indications of the Bluetooth multimedia devices.

Then during the implementation of the localization step 300, the controlling device DEV can compare the signal strength indications obtained at step 100 with the database to infer a localization of the device DEV. If this fingerprinting implementation with a RSSI value as the signal strength indication, the harmonization step 150 described above is superfluous because this implementation needs not rely on an absolute signal strength value but rather on a signature of the signal strength.

In order to implement comparison of data and estimation of the position based on this comparison, one of the following methods may be used:
Probabilistic method
K-Nearest Neighbors algorithms,
Neural networks,
Support vector machines (SVM)
Smaller M-vertex polygon.

Figure 5:
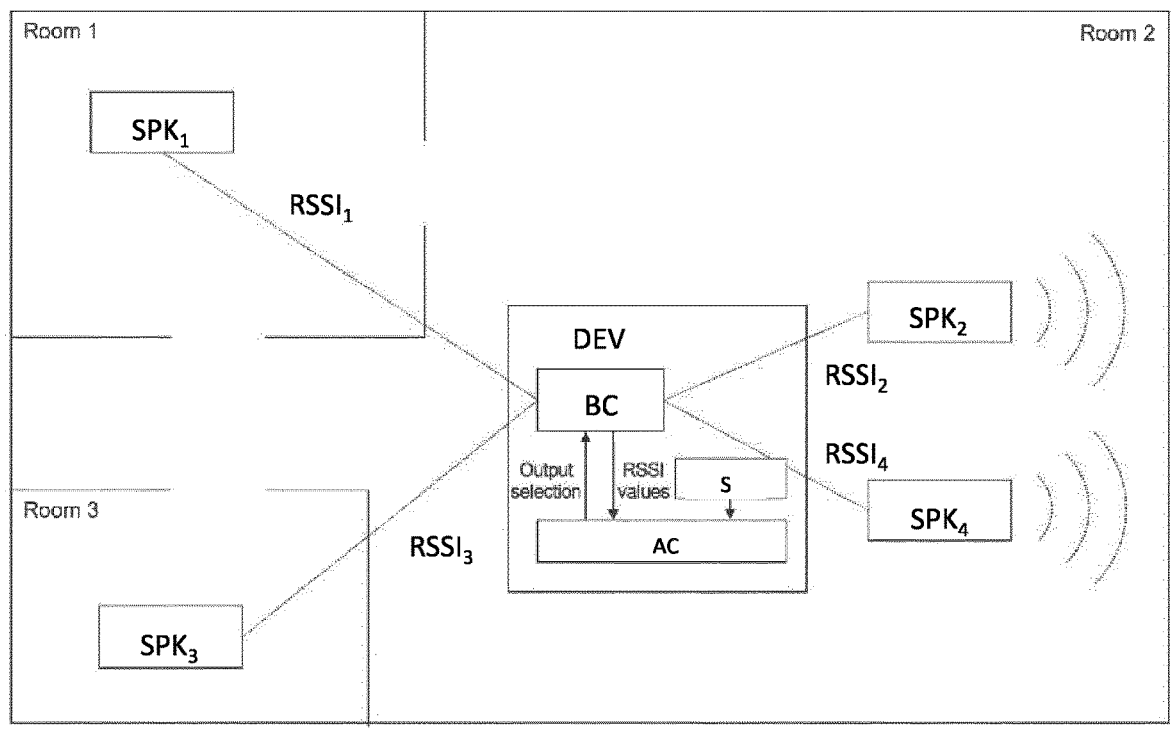
FIG. 5 shows an example of speaker selection based on localization of the device according to another embodiment of the invention.

In an a special embodiment of the fingerprinting approach, schematically shown in FIG. 5, the controlling device DEV further comprises at least one additional motion and/or orientation sensor S. Said sensor can be for instance an accelerometer, a gyroscope, a magnetometer.

In that case, the history of sensor data can be used to infer a trajectory of the controlling device DEV, which is advantageously combined to the signal strength indications of the Bluetooth multimedia devices so as to increase localization accuracy.

The localization performed based on the RSSI values and as the case may be on the orientation and motion values sensed by the sensors S can be performed by a calculator of the Bluetooth chip or by an additional calculator AC of the device DEV, which can be for instance a processor, a microprocessor, or a microcontroller. In that case the additional calculator AC may receive the RSSI values as well as the sensors data, compute the localization of the controlling device DEV and return said localization to the Bluetooth chip BC for selecting the Bluetooth multimedia device(s).

Localization of the controlling device DEV can also be combined with the proximity switching embodiments described above, in order to make a more accurate speaker output selection. For instance, the localization can be used to infer a room in which the controlling device is located, and then one or several Bluetooth multimedia device(s) from those located in the room can be selected according to the value of their signal strength indications.

Moreover, localization of the controlling device DEV can also be used to perform a processing and adapt the audio stream on each speaker according to the position of the controlling device, during a step 400.

According to an example, the volume of each speaker SPK can be changed proportionally based on the distance between each speaker and the controlling device DEV in order to achieve a constant global volume.

According to another example, a plurality of streams corresponding to the various channels of an audio recording can be allocated differently between the selected speakers according to the position of the controlling device relative to the speakers. Therefore, even in a single room, the selection according to the invention can allow obtaining better acoustic rendering.

According to still another example, the processing may comprise determining the acoustic effects of the distance between the controlling device DEV and each of the plurality of Bluetooth multimedia devices and adapting the frequencies of the audio streams of the respective devices to compensate for these acoustic effects.

Preferably, the Bluetooth chip BC is further configured to regularly ping the Bluetooth multimedia devices SPK that do not currently stream the multimedia stream, for instance by sending empty buffers, in order to prevent them from automatically switching off.

The invention claimed is:

1. A Bluetooth multimedia system comprising:
a device for controlling Bluetooth multimedia devices, the device comprising:
  a Bluetooth chip configured to:
    establish a point to multipoint audio link from said Bluetooth chip to a plurality of Bluetooth multimedia devices; and
    retrieve from each Bluetooth multimedia device an indication of a signal strength of each link between the device and the corresponding Bluetooth multimedia device, and
  a calculator configured to determine, based on the retrieved signal strength indications, a localization of the device relative to the Bluetooth multimedia devices by fingerprinting,
wherein the Bluetooth chip is further configured to:
  select at least one Bluetooth multimedia device to which the multimedia stream is to be streamed based on the retrieved indications of signal strength and the determined localization, and
  stream a multimedia stream to the selected at least one of the plurality of Bluetooth multimedia devices.

2. The system according to claim 1, wherein the Bluetooth chip is configured to select the Bluetooth multimedia device which indication of signal strength is highest.

3. The system according to claim 2, wherein the Bluetooth chip is further configured to ping each Bluetooth multimedia device to which no multimedia stream is streamed to prevent the Bluetooth multimedia device from switching off.

4. The system according to claim 1, wherein the Bluetooth chip is configured to select each Bluetooth multimedia device which indication of signal strength is higher than a predetermined threshold.

5. The system according to claim 1, wherein the calculator (BC, AC) is configured to determine the localization of the device by triangulation.

6. The system according to claim 5, wherein the Bluetooth chip is further configured to adapt the multimedia stream of each Bluetooth multimedia device according to the localization of the device, said adaptation comprising adapting an emission volume, a frequency, or the allocation of each of a plurality of channels of the multimedia stream.

7. The system according to claim 5, further comprising at least one motion or orientation sensor, and wherein the calculator is configured to determine a localization of the device based on the retrieved signal strength indications and data acquired by the at least one motion or orientation sensor.

8. The system according to claim 1, wherein the Bluetooth chip is further configured to adapt the multimedia stream of each Bluetooth multimedia device according to the localization of the device, said adaptation comprising adapting an emission volume, a frequency, or the allocation of each of a plurality of channels of the multimedia stream.

9. The system according to claim 8, further comprising at least one motion or orientation sensor, and wherein the calculator is configured to determine a localization of the device based on the retrieved signal strength indications and data acquired by the at least one motion or orientation sensor.

10. The system according to claim 1, further comprising at least one motion or orientation sensor, and wherein the calculator is configured to determine a localization of the device based on the retrieved signal strength indications and data acquired by the at least one motion or orientation sensor.

11. The system according to claim 1, wherein the Bluetooth chip is further configured to ping each Bluetooth multimedia device to which no multimedia stream is streamed to prevent the Bluetooth multimedia device from switching off.

12. The system according to claim 1, further comprising the plurality of Bluetooth speakers.

13. The system according to claim 1, wherein when determining the localization of the device by finger printing, the calculator is further configured to:
  determine, based on the retrieved signal strength indications, signal strength vectors; and
  map the determined signal strength vectors with a corresponding physical location.

14. A method for controlling Bluetooth multimedia devices by a Bluetooth chip, comprising:
  creating a point-to-multipoint audio link from said Bluetooth chip to a plurality of Bluetooth multimedia devices,
  retrieving from each Bluetooth multimedia device an indication of a signal strength of each link between the device and the corresponding Bluetooth multimedia device,
  determining, based on the retrieved signal strength indications, a localization of the device relative to the Bluetooth multimedia devices by fingerprinting;
  selecting at least one Bluetooth multimedia device based on the retrieved signal strength indications and the determined localization, and streaming a multimedia stream to each of the selected Bluetooth multimedia devices.

15. The method according to claim 14, wherein the signal strength indication retrieved from each of the plurality of Bluetooth multimedia devices is a RSSI value, and the method further comprises a step of harmonizing the RSSI values of the Bluetooth multimedia devices, said harmonizing step comprising applying weighing factors to the RSSI values of the various Bluetooth multimedia devices.

16. The method according to claim 14, wherein the selection step is performed by:
   selecting the Bluetooth multimedia device which signal strength indication is highest, or
   selecting each Bluetooth multimedia device which signal strength indication is higher than a predetermined threshold.

17. The method of claim 14, wherein determining the localization of the device by fingerprinting further includes:
   determining, based on the retrieved signal strength indications, signal strength vectors; and
   mapping the determined signal strength vectors with a corresponding physical location.

18. A non-transitory computer-readable storage medium, storing a computer program comprising a set of instructions, which when executed by one or more processors, cause the one or more processors to:
   establish a point to multipoint audio link from said Bluetooth chip to a plurality of Bluetooth multimedia devices;
   retrieve from each Bluetooth multimedia device an indication of a signal strength of each link between the device and the corresponding Bluetooth multimedia device;
   determine, based on the retrieved signal strength indications, a localization of the device relative to the Bluetooth multimedia devices by fingerprinting;
   select at least one Bluetooth multimedia device to which the multimedia stream is to be streamed based on the retrieved indications of signal strength and the determined localization; and
   stream a multimedia stream to the selected at least one of the plurality of Bluetooth multimedia devices.

19. The non-transitory computer-readable storage medium of claim 18, wherein when determining the localization of the device by finger printing, the one or more processors are further configured to:
   determine, based on the retrieved signal strength indications, signal strength vectors; and
   map the determined signal strength vectors with a corresponding physical location.

\* \* \* \* \*